United States Patent [19]

Thate et al.

[11] Patent Number: 4,496,273
[45] Date of Patent: Jan. 29, 1985

[54] ARRANGEMENT FOR SUPPLYING UNEXPOSED X-RAY FILMS TO A HANDLING APPARATUS

[75] Inventors: Kurt Thate; Heinrich Färber; Jürgen Müller, all of Munich, Fed. Rep. of Germany

[73] Assignee: Agfa-Gevaert AG, Leverkusen, Fed. Rep. of Germany

[21] Appl. No.: 384,159

[22] Filed: Jun. 1, 1982

[30] Foreign Application Priority Data

Jun. 6, 1981 [DE] Fed. Rep. of Germany ....... 3122582

[51] Int. Cl.³ ............................................ B65G 65/00
[52] U.S. Cl. .................................... 414/411; 414/403; 271/164
[58] Field of Search ............... 414/403, 411, 414, 416; 378/167, 181; 271/162, 164

[56] References Cited

U.S. PATENT DOCUMENTS 4,249,819 2/1981 Boser et al. .......................... 414/411
4,365,793 12/1982 Van Blokland et al. ........... 414/411

Primary Examiner—Robert J. Spar
Assistant Examiner—Stuart Millman
Attorney, Agent, or Firm—Michael J. Striker

[57] ABSTRACT

An arrangement for supplying unexposed X-ray films to a handling apparatus, such as a cassette unloading and loading apparatus, includes a channel member bounding a channel into which a receptacle unit including an inner receptacle member and an outer tubular casing member can be introduced. The casing member is shiftable relative to the receptacle member so as to respectively cover and uncover a withdrawing opening of the receptacle member in its closed and open relative position. At least one arresting device is provided which arrests the members in their closed position. The arresting device is released by a releasing device mounted on the channel member when the receptacle unit reaches its releasing position in the channel. Then, the casing member is retained in the releasing position, and the receptacle member continues its movement until it reaches its open position. During the extraction of the receptacle unit from the channel, the releasing device initially retains the casing member, so that the receptacle member reaches its closed position first, and only then is the extraction of the entire receptacle unit commenced. The arresting device includes a biased rocking element having a detaining projection engaging in a recess of the receptacle member. A biased operating pin of the releasing device acts through an aperture of the casing member on the rocking element.

10 Claims, 4 Drawing Figures

ARRANGEMENT FOR SUPPLYING UNEXPOSED X-RAY FILMS TO A HANDLING APPARATUS

BACKGROUND OF THE INVENTION

The present invention relates to arrangements for supplying photosensitive sheets unexposed to ambient light to a handling machine in general, and more particularly to an arrangement for supplying X-ray films to film unloading and loading apparatus in a manner which prevents ambient light from reaching the films.

There are already known various arrangements for supplying X-ray films to an unloading and loading apparatus which removes X-ray exposed films from cassettes and inserts new X-ray films into such cassettes for future use. One of the conventional loading and unloading machines includes a plurality of channel members which define respective channels for receiving storage receptacles containing stacks of X-ray films of different sizes. Each of the channel members is equipped with withdrawing means which are operative for withdrawing the X-ray films one after the other from the respective receptacles, after an opening of the respective receptacle, which has previously been closed by a lid, is uncovered or opened.

This construction was disclosed, for instance, in the published German patent application No. DE-OS 26 07 876. In this construction of the unloading and loading machine for X-ray film cassettes, storage receptacles having different sizes corresponding to the sizes of the X-ray films accommodated therein can be introduced, in a drawer-like fashion, into their respective channels. After the introduction of the respective storage receptacle into its associated channel, a drive of friction rollers is energized, so that such friction rollers open the withdrawing opening of the storage receptacle. Once the opening is uncovered, the withdrawing means of the machine is able to engage and withdraw the respectively uppermost X-ray film from the stack of films contained in the respective storage receptacle.

Experience with these drawer-like storage receptacles has shown that they are very prone to malfunction. So, for instance, the lid for the withdrawing opening can become stuck and cannot be sufficiently opened, or the lid is not fully closed during a premature removal of the storage container from the channel, so that the films remaining in the storage container become exposed to ambient light and thus usually damaged or destroyed.

SUMMARY OF THE INVENTION

Accordingly, it is a general object of the present invention to avoid the disadvantages of the prior art.

More particularly, it is an object of the invention to so construct the storage receptacle as not to possess the disadvantage of the conventional storage receptacles for stacks of X-ray films.

Still another object of the present invention is to develop a storage receptacle of the type here under consideration which can easily be opened and closed by simple means, and yet prevents penetration of ambient light to the films constituting the contents of the receptacle even when the receptacle is removed from the channel prior to the exhaustion of its contents.

It is yet another object of the present invention to provide an arrangement for supplying the X-ray films to the unloading and loading machine in a manner which avoids penetration of ambient light to the contents of the receptacle.

A concomitant object of the invention is to devise an arrangement of the above type which is simple in construction, inexpensive to manufacture, easy to use, and reliable in operation nevertheless.

In pursuance of these objects and others which will become apparent hereafter, one feature of the present invention resides in an arrangement for supplying photosensitive sheets, especially X-ray films, in an ambient light unexposed manner to a handling apparatus, particularly X-ray film unloading and loading apparatus, which arrangement comprises means for defining at least one light-tightly obstructable channel; at least one tubular, substantially cross-sectionally rectangular, casing member bounding a passage; at least one substantially rectangularly prismatic receptacle member having a recess for receiving at least one of the sheets and preferably a stack of such sheets, and a withdrawing opening for withdrawing the contents of the recess, the receptacle member being received in the passage for movement between a closed and an open position in which the casing member respectively light-tightly covers and uncovers the withdrawing opening; means on the members for arresting the receptacle member in its closed position so that the members constitute a transportable unit which light-tightly obstructs the channel when inserted into the same and assuming a releasing position therein; means situated at the defining means for releasing the arresting means in the releasing position of the unit; and abutment means extending into the channel and into the path of movement of the casing member beyond the releasing position.

Advantageously, the arresting means includes at least one rocking element pivotally mounted on the casing member and having a detaining projection, and at least one detaining recess in the receptacle member aligned with the retaining projection and at least partially receiving the same in the closed position and in the absence of operation of the arresting means. The casing member advantageously has a through aperture registering at least with a part of the rocking element, and the releasing means includes an operating element at least partially extending through the aperture in the releasing position of the unit to operate the rocking element.

In an advantageous construction according to the present invention, the operating element is constructed as an operating pin, the releasing means then further including means for mounting the operating pin on the defining means, and means for urging the operating means into the aperture in the releasing position of the unit. Then, it is advantageous when the mounting means for the operating pin includes a lever connected to the operating pin, and a pivot pivotally mounting the lever on the defining means. In accordance with an advantageous facet of the present invention, the operating pin has a substantially conical free end portion which is received in the aperture in the releasing position of the unit and which acts on the rocking element of the arresting means. It is further advantageous when the pivot for the lever of the releasing means is situated between the open end of the channel through which the unit is insertable into the channel and the operating pin, and more remotely from the central axis of the channel than the free end portion of the operating pin.

According to a further advantageous concept of the present invention, the channel has a cross section substantially corresponding to that of the outer periphery of the casing member, and the abutment means includes means for delimiting an axial extension of the channel that extends in the direction of introduction of the unit into the channel beyond the releasing position, the extension having a cross section substantially corresponding to that of the outer periphery of the receptacle member.

Especially advantageous results are obtained when the arrangement further includes means for preventing penetration of ambient light into the unit when located outside of the channel, such preventing means including at least one pair of parallel confining walls on one of the members at least at the region of the withdrawing opening and bounding a groove with one another, and at least one wall on the other of the members extending into the groove. In this respect, it is particularly advantageous when the receptacle member has an end portion extending out of the casing member even in the closed position and having an outwardly extending flange and a circumferentially extending projection on the flange which projects axially toward the casing member, and when the casing member has a circumferentially extending groove at its end face which faces toward the flange, which receives the projection of the flange of the receptacle member in the closed position of the latter. According to an additional feature of the present invention, the arrangement further includes suction means situated beyond the channel as considered in the direction of introduction of the unit into the channel, and the receptacle member, or an insert thereof, or both, have a cutout juxtaposed with the suction means when the casing member assumes its releasing position and the receptacle member is in its open position.

When the arrangement of the present invention is constructed in the above-discussed manner, there is obtained an automatic release and opening of the light-tight transportable unit during its introduction into the channel of the apparatus, as well as an automatic light-tight closing and arresting of the transportable unit during its extraction from the channel. This is achieved without requiring any action, such as operation of a lever, on the part of the operating personnel, and without requiring any action of any active components of the machine on the transportable unit.

The novel features which are considered as characteristic of the invention are set forth in particular in the appended claims. The improved arrangement for supplying unexposed sheets to a handling machine itself, however, both as to its construction and its mode of operation, together with additional features and advantages thereof, will be best understood upon perusal of the following detailed description of certain specific embodiments with reference to the accompanying drawings.

DETAILED DESCRIPTION OF THE PREFERRED EMBODIMENT

Figures 1, 2:
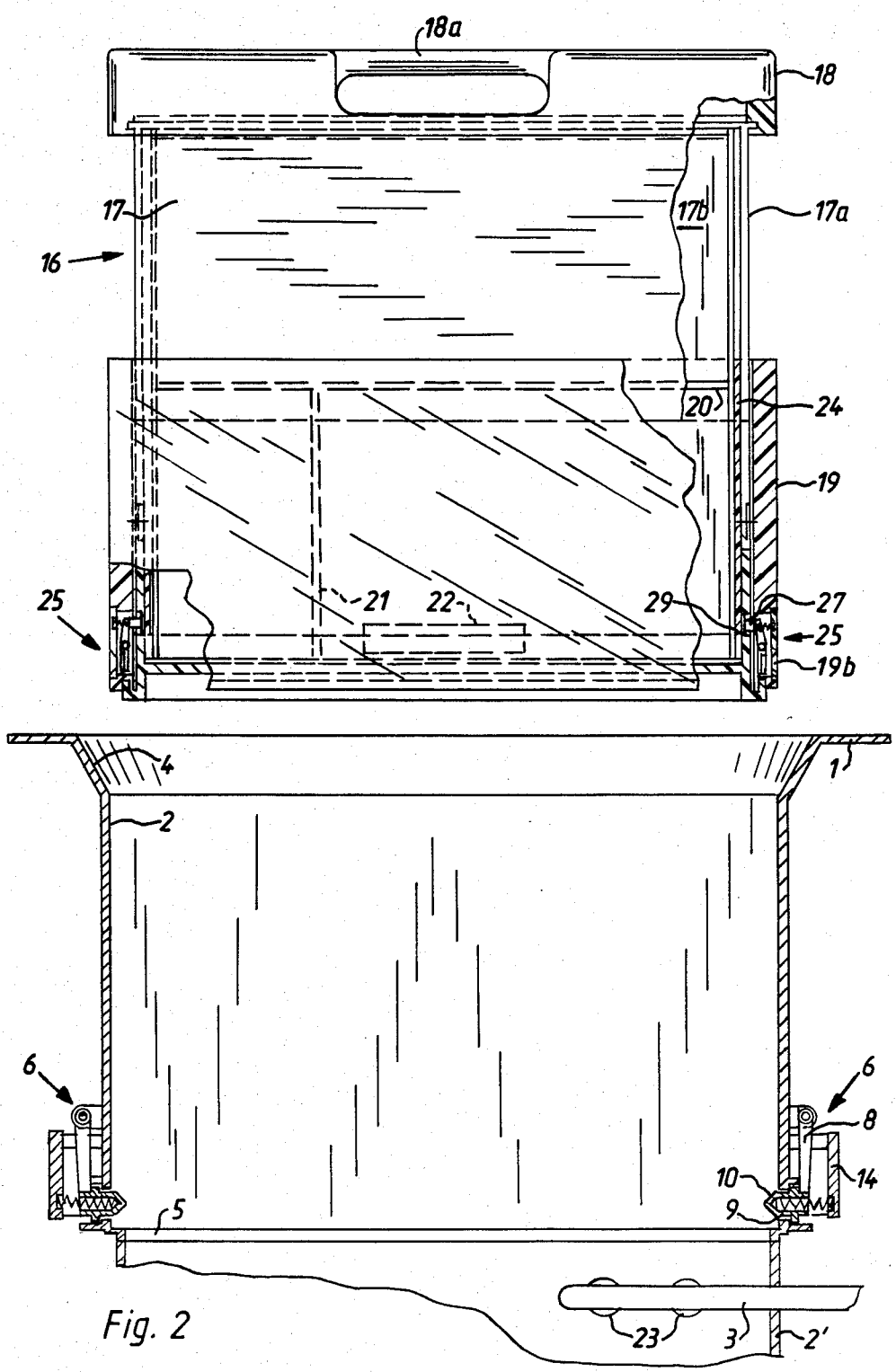
FIG. 1 is an axial sectional view of a channel member constructed in accordance with the present invention.
FIG. 2 is a partially sectioned top plan view of a transportable receptacle unit according to the invention.

Referring now to the drawings in detail, and first to FIG. 2 thereof, it may be seen that the reference numeral 1 has been used to identify a front wall of a machine in which the arrangement of the present invention is being used. The machine is preferably constructed, in a conventional manner, as an X-ray cassette unloading and loading apparatus. Such an apparatus is usually provided with a plurality of channel members 2, of which only one is shown in the drawing and will be discussed below. A recess is formed in the front wall 1, this recess having dimensions exceeding the corresponding dimensions of the channel of the channel member 2 and converging, in a funnel-like manner, toward the channel which has a substantially rectangular cross section. The aforementioned funnel-shaped recess facilitates the introduction of a transportable receptacle unit into the channel, and its extraction from the channel.

As considered in direction from the front wall, withdrawing means 3 is arranged in the last third of the channel of the channel member 2 or, in other words, in an extension of the channel proper. The withdrawing means 3 is operative, in a well known manner, to engage a film or sheet contained in the receptacle unit, for instance, by suction, and to withdraw such film or sheet from the receptacle unit. A circumferentially extending abutment 5 is arranged in the proximity of the withdrawing means 3 and at the end of the channel which is remote from an open end 4 of the channel through which the receptacle unit is introduced. Beyond the abutment means or ledge 5, the channel of the channel member 2 merges into its aforementioned extension which is delimited in the circumferential direction by another channel member 2' and which has a somewhat smaller cross section than the channel of the channel member 2. The extension will be discussed in more detail later.

Figure 4:
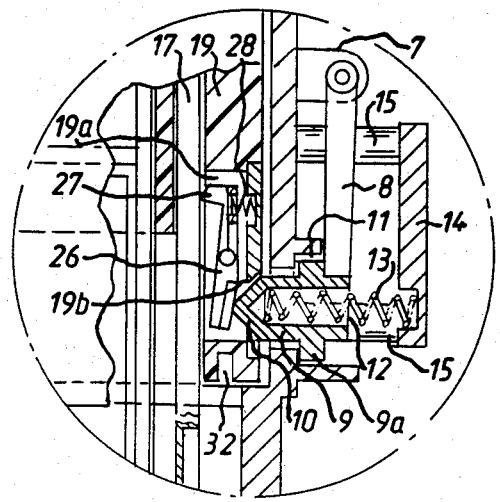
FIG. 4 is a sectional view, at an enlarged scale, of a detail A of FIG. 3.

Between the abutment ledge 5 and the open end 4 of the channel of the channel member 2, there are further provided, at the mutually opposite narrow sides of the channel member 2, releasing means 6 which are shown in more detail in FIG. 4 and which will be discussed in detail below. As seen particularly in FIG. 4, a bracket 7 is provided at the outer side of the channel member 2. A lever 8 is pivotally mounted on the bracket 7 and it carries, at its free end remote from the bracket 7, an operating pin 9 having a substantially conical free end portion 10. The pivoting axis of the lever 8 on the bracket 7 is situated more remotely from the central axis of the channel of the channel member 2 than the end portion 10, and, as seen in the direction of introduction of the receptacle unit, ahead of the operating pin 9. The operating pin 9 extends through a bore 11 provided in the respective narrow lateral wall of the channel member 2 and has, at its end remote from the conical free end portion 10, a bore 12 into which a compression spring 13 is inserted. The other end of the compression spring 13 rests against a plate 14 which is connected, by means of a connecting rod 15, with the channel member 2. Furthermore, the operating pin 9 is provided with an outwardly projecting collar 9a which serves as an abutment collar and limits the extent of movement of the operating pin 9 and thus of its conical free end 10 through the bore 11.

In FIG. 1, there is depicted a transportable receptacle unit 16 which basically consists of a box-shaped base body or receptacle member 17, a gripping handle portion 18, and a tubular casing member 19 which is axially shiftably mounted on the receptacle member 17. The receptacle member 17 is closed at all sides, but has at its end remote from the gripping handle portion 18 a withdrawing opening 20 which extends over substantially the entire width of the receptacle member 17 and over about one half of its axial length, being provided in one of the major walls of the receptacle member 17. An insert 21 is inserted into the opening 20. The insert 21 bounds a recess which is dimensionally fitted to the stack of films to be accommodated in the receptacle unit 16. The bottom wall of the insert 21 is provided with a cutout 22 into or through which at least one suction head 23 FIG. 2 of the withdrawing means 3 can operate. As a result of this expedient, it is achieved that, after the last sheet of film of the respective stack has been withdrawn, the suction head 23 draws ambient air through the cutout 22, so that the attendant pressure increase in the suction head 23 can be used for generating a warning signal notifying the operating personnel that the respective receptacle unit 16 has been emptied.

The gripping handle portion 18 is connected by suitable means with the receptacle member 17, such as to be rigid therewith. The gripping handle portion 18 includes a handgrip 18a which is to be used during the transportation of the receptacle unit 16, during its introduction into the channel of the channel member 2, and during its extraction therefrom.

The tubular casing member 19 has a rectangular cross section and overall rectangularly prismatic outline, and so tightly embraces the receptacle member 17 that, while the casing member 19 and the receptacle member 17 can still be axially shifted relative to one another, undesirable penetration of light into the interior of the receptacle unit 16 is reduced if not eliminated in the closed condition of the receptacle unit 16. To completely eliminate light penetration into the receptacle unit 16 in its closed position, the casing member 19 is provided with a pair of confining walls 24, which are situated above the withdrawing opening 20 and along the two narrow sides of the casing member 19, being arranged at the lower side of the casing member 19. Lateral walls 17a and a covering wall 17b of the receptacle member 17 then run between the confining walls 24 of the casing member 19.

At the end of the receptacle unit 16 which is remote from the gripping handle portion 18, there are provided, at the narrow lateral walls of the receptacle unit 16, arresting elements 25 which are effective between the casing member 19 and the receptacle member 17. These arresting elements 25 may also be best seen in the enlarged illustration of FIG. 4. A rocking element 26 is accommodated in a recess 19a of the casing member 19. The rocking element 26 has a detaining projection 27 which extends toward the receptacle member 17. A compression spring 28 is inserted between the casing member 19 and the rocking element 26, being effective for urging the detaining projection 27 toward the receptacle member 17. The other end of the pivotally mounted rocking element 26 is situated at the region of an aperture 19b of the casing member 19, in such a manner that the conical end portion or tip 10 of the operating member 9 engages this end of the rocking element 26 when passing through the aperture 19b. As may best be seen in FIG. 3, a detaining recess 29 is provided at each of the narrow sides of the receptacle member 17 at the end thereof which is remote from the gripping handle portion 18. The detaining projection 27 of the rocking element 26 penetrates into and engages in the respective detaining recess 29, due to the force of the spring 28, so long as the receptacle member 17 and the casing member 19 assume their closed position relative to one another, and so long as the releasing arrangement is ineffective. This closed position of the receptacle unit 16 is shown in FIG. 1.

Having so described the construction of the supplying arrangement of the present invention, its operation and use will now be discussed. After the respective receptacle unit 16 has been filled with the stack of appropriate films in a darkroom, it is transported to the channel members 2,2′, that is, to the cassette unloading and loading apparatus, in the condition illustrated in FIG. 2. As mentioned before, in this condition the casing member 19 and the receptacle member 17 assume their closed position relative to one another, in which the casing member 19 is situated at the end of the receptacle member 17 which is remote from the gripping handle portion 18. Also, the detaining projection 27 of the rocking element 26 engages in the detaining recess 29 of the receptacle member 17, thus arresting the members 17 and 19 in the closed position. When thus arrested, the casing member 19 cannot be moved out of the closed position, either inadvertently or if the receptacle unit 16 falls to the ground.

Then, the receptacle unit 16 can be inserted into any of the plurality of channels of the channel member 2, which is empty at this time, or which is emptied for this purpose. The cross section of the channel of the channel member immediately behind the inlet opening 4 corresponds to the outer periphery cross section of the casing member 19. During the introduction of the receptacle unit 16 into the channel of the channel member 2, as soon as the leading end of the casing member 19 engages the operating pin 9, the conical tip 10 of the latter causes the operating pin 9 to retreat against the action of the spring 13 in the outward direction as the receptacle unit 16 continues its introduction movement. The operating pin 9 remains in this retracted position until it becomes aligned with the aperture 19b of the casing member 19. At this time, the conical tip 10 of the operating pin is pushed by the spring 13 into the aperture 19b and acts on the end of the rocking element 26 which is in alignment with the aperture 19b. Since the force of the spring 13 is greater than that of the spring 28, the rocking element 26 is pivoted in the clockwise direction as considered in FIG. 4, so that the detaining projection 27 of the rocking element 26 is removed from the detaining recess 29 of the receptacle member 17.

By the time the operating element or pin 9 is able to penetrate into the aperture 19b, the receptacle unit 16 has reached its releasing position in which the casing member 19 abuts the abutment ledge 5. Thus, the abutment ledge 5 prevents the casing member 19 from continuing its introducing movement as further force is applied to the gripping handle portion 18. This, however, is not true about the receptacle member 17 which has an outer cross section which corresponds to the cross section of the channel extension delimited by the other channel member 2′. Since the arresting means 25 is released, the receptacle member 17 continues its movement into the reduced cross section channel extension in the channel member 2′, so that a relative sliding movement takes place between the receptacle member 17 and the casing member 19. In this manner, the opening 20 in the receptacle member 17 becomes uncovered or unobstructed. As a result of this, the withdrawing device 3 can singularize and individually withdraw the sheets or films from the receptacle member 17 through the withdrawing opening 20. After the withdrawal of the entire contents of the receptacle member 17, the receptacle unit 16 is extracted from the channel of the channel member in the opposite direction and in a reverse succession of the above-discussed steps, by manually applying extraction force to the gripping handle portion 18. Initially, the receptacle member 17 alone is being extracted, while the casing member 19 is retained in its releasing position by the operating pin 9 which is still received in the aperture 19b. This retention of the operating pins 9 in the apertures 19b is primarily caused by the fact that the pivoting axes of the levers 8 are farther apart than the points of contact of the conical tips 10 of the operating members 9 with the receptacle member 17. Especially because of the arrangement of the brackets 7 between the inlet opening 4 and the operating pins 9, it is achieved that, during the introduction of the receptacle unit 16, the lever 8 is moved slightly outwardly while, during the extraction of the receptacle unit 16, the lever 8 braces itself somewhat against pivoting.

Figure 3:
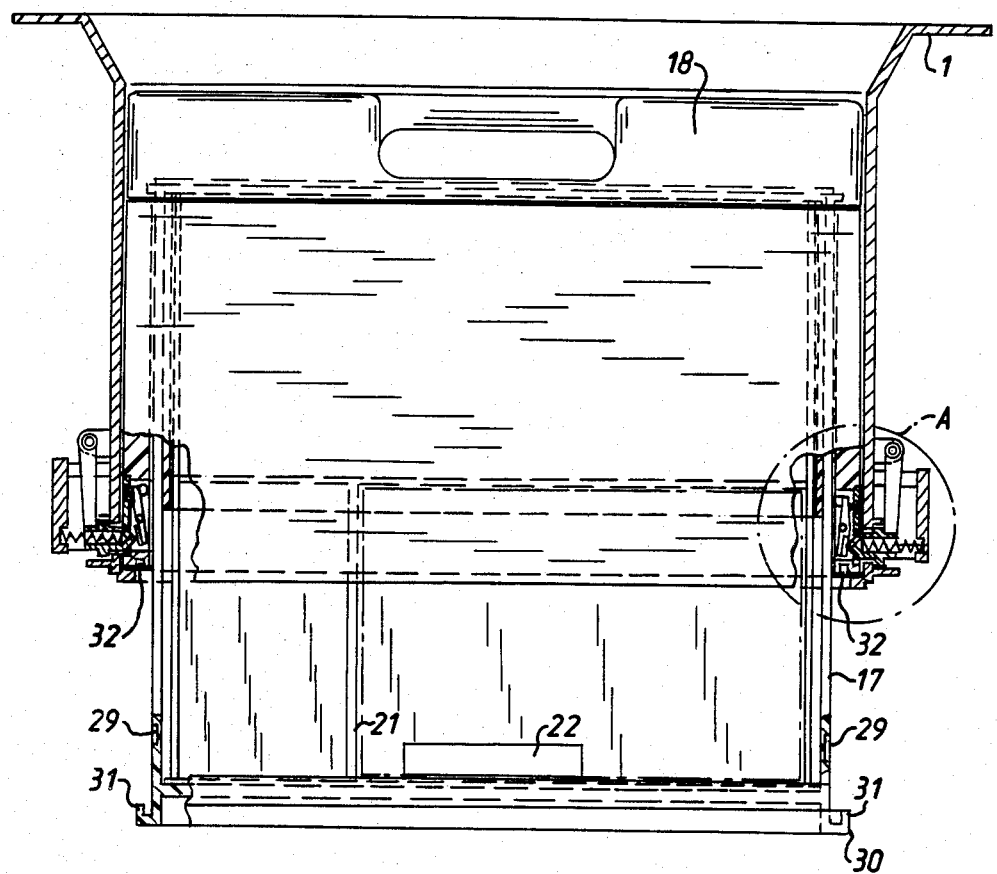
FIG. 3 is a view similar to FIG. 1 but showing the unit of FIG. 2 within the channel of the channel member in its open position.

As may be seen in FIG. 3, the end of the receptacle member 17 which is remote from the gripping handle portion 18 is provided with an outwardly extending flange 30 provided with a circumferentially extending projection 31 which projects toward the associated end face of the casing member 19 which is provided with a groove 32 that is axially aligned with the projection 31. In this manner, there is obtained light path interruption at the end regions between the casing member 19 and the receptacle member 17.

As soon as the projection 31 penetrates into the groove 32, the casing member 19 is entrained for joint movement with the receptacle member 17. The extraction force applied by the operator overcomes the force of the extended operating pin 9 and the surface bounding the aperture 19b of the casing member 19 pushes the conical tip 10 of the operating member 9 outwardly. This is accompanied by the pivoting of the rocking element 26 under the influence of the spring 28. This pivoting continues until the detaining projection 27 of the rocking element 26 contacts the receptacle member 17 and eventually penetrates into and engages in the detaining recess 29 of the receptacle member 17. When this happens, the receptacle unit 16 is again closed and locked in its closed position, so that it can be transported to the location at which it can be again loaded with fresh stack of films.

As discussed above, the introduction of the receptacle unit 16 into the channel simultaneously results, in one continuous operation, in the opening of the receptacle unit 16. Conversely, during the extraction operation, the receptacle unit 16 is closed first, and only subsequently removed from the channel. This has the advantage that any receptacle unit 16 which has not yet been emptied of its contents can be extracted from the respective channel whenever desired, without any damage to the films still contained therein. This is particularly advantageous when it is desired to substitute a receptacle unit 16 containing films of a different size for that already introduced into the machine 1.

It will be understood that each of the elements described above, or two or more together, may also find a useful application in other types of arrangements differing from the type described above.

While the invention has been illustrated and described in an arrangement for supplying unexposed X-ray films to an X-ray cassette unloading and loading apparatus, it is not intended to be limited to the detail shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

We claim:

1. An arrangement for supplying photosensitive sheets, especially X-ray films of a cassette, in an ambient light unexposed manner to a handling apparatus, particularly X-ray film unloading and loading apparatus, comprising means for defining at least one light-tight obstructable channel; at least one tubular, substantially cross-sectionally rectangular, casing member bounding a passage; at least one substantially rectangularly prismatic receptacle member having a recess for receiving the cassette and a withdrawing opening for withdrawing at least one of the sheets of said cassette, said receptacle member being received in said passage for movement between a closed and an open position in which said casing member respectively light-tightly covers and uncovers said withdrawing opening, said casing member being displaced in said open position of said receptacle member so that said withdrawing opening is after said casing member and a part of the cassette remaining in said casing member; while a remaining part of the cassette remains outside of said casing for film withdrawing; means on said members for arresting said receptacle member in said closed position thereof so that said members constitute a transportable unit which light-tightly obstructs said channel when inserted into the same and assuming a releasing position therein; means situated at said defining means for releasing said arresting means in said releasing position of said unit and abutment means extending into said channel and into the path of movement of said casing member after said releasing position.

2. The arrangement as defined in claim 1, wherein said arresting means includes at least one rocking element pivotally mounted on said casing member and having a detaining projection, and at least one detaining recess in said receptacle member aligned with said retaining projection and at least partially receiving the same in said closed position and in the absence of operation of said arresting means.

3. The arrangement as defined in claim 2, wherein said casing member has a through aperture registering at least with a part of said rocking element; and wherein said releasing means includes an operating element at least partially extending through said aperture in said releasing position of said unit to operate said rocking element.

4. The arrangement as defined in claim 3, wherein said operating element is an operating pin; and wherein said releasing means further includes means for mounting said operating pin on said defining means, including a lever connected to said operating pin, and a pivot pivotally mounting said lever on said defining means, said releasing means further including means for urging said operating pin into said aperture in said releasing position of said unit.

5. The arrangement as defined in claim 4, wherein said operating pin has a substantially conical free end portion received in said aperture in said releasing position of said unit and acting on said rocking element of said arresting means.

6. The arrangement as defined in claim 5, wherein said channel has an open end through which said unit is insertable into said channel; and wherein said pivot for said lever is situated between said open end of said channel and said operating pin and more remotely from the axis of said channel than said free end portion of said operating pin.

7. The arrangement as defined in claim 1, further comprising means for preventing penetration of ambient light into said unit when located outside said channel, including at least two parallel confining walls on one of said members at least at the region of said withdrawing opening and bounding a groove with one another, and at least one wall on the other of said members extending into said groove.

8. An arrangement for supplying photosensitive sheets, especially X-ray films, in an ambient light unexposed manner to a handling apparatus, particularly X-ray film unloading and loading apparatus, comprising means for defining at least one light-tight obstructable channel; at least one tubular, substantially cross-sectionally rectangular, casing member bounding a passage, said channel having a cross section substantially corresponding to that of the outer periphery of said casing member; at least one substantially rectangularly prismatic receptacle member having a recess for receiving at least one of the sheets and a withdrawing opening for withdrawing the contents of said recess, said receptacle member being received in said passage for movement between a closed and an open position in which said casing member respectively light-tightly covers and uncovers said withdrawing opening; means on said members for arresting said receptacle member in said closed position thereof so that said members constitute a transportable unit which light-tightly obstructs said channel when inserted into the same and assuming a releasing position therein; means situated at said defining means for releasing arresting means in said releasing position of said unit; and abutment means extending into said channel and into the path of movement of said casing member after said releasing position, said abutment means including means for delimiting an axial extension of said channel extending in the direction of introduction of said unit after said releasing position and having a cross section substantially corresponding to that of the outer periphery of said receptacle member.

9. An arrangement for supplying photosensitive sheets, especially X-ray films, in an ambient light unexposed manner to a handling apparatus, particularly X-ray film unloading and loading apparatus, comprising means for defining at least one light-tightly obstructable channel; at least one tubular, substantially cross-sectionally rectangular, casing member bounding a passage; at least one substantially rectangularly prismatic receptacle member having a recess for receiving at least one of the sheets and a withdrawing opening for withdrawing the contents of said recess, said receptacle member being received in said passage for movement between a closed and an open position in which said casing member respectively light-tightly covers and uncovers said withdrawing opening, said receptacle member having an end portion extending out of said casing member in said closed position and having an outwardly extending flange and a circumferentially extending projection on said flange projecting axially toward said casing member, said casing member having an end face facing said flange and having a circumferentially extending groove therein which receives said projection of said flange in said closed position; means on said members for arresting said receptacle member in said closed position thereof so that said members constitute a transportable unit which light-tightly obstructs said channel when inserted into the same and assuming a releasing position therein; means situated at said defining means for releasing said arresting means in said releasing position of said unit; and abutment means extending into said channel and into the path of movement of said casing member after said releasing position.

10. An arrangement for supplying photosensitive sheets, especially X-ray films of a magazine, in an ambient light unexposed manner, comprising:
a receptacle for holding the magazine and being movable between an open and a closed position:
a channel member containing an inlet passage;
a tubular casing member being axially shiftably mounted and surrounding said receptacle in said closed position and during which overlapping only a part of the magazine surface, said tubular casing member having a wide side on which there extends a film discharge opening through which the magazine is displaced to said open position of said receptacle, said tubular casing member forming a light tight seal between inself and the magazine as well as between the magazine and said channel member during said open and closed positions of said receptacle and during the transfer of the magazine from said open to said closed position of said receptacle and vice versa; and
suction means situated after said inlet passage as considered in the direction of introduction of said receptacle into said inlet passage, said receptacle member having a cutout juxtaposed with said suction means when said tubular casing member assumes releasing position in said channel member and said receptacle is in said open position.

* * * * *